United States Patent
Bortnikov et al.

(10) Patent No.: US 8,661,080 B2
(45) Date of Patent: Feb. 25, 2014

(54) PROPAGATING CHANGES IN TOPIC SUBSCRIPTION STATUS OF PROCESSES IN AN OVERLAY NETWORK

(75) Inventors: Vita Bortnikov, Haifa (IL); Gregory Chockler, Haifa (IL); Alexey Roytman, Yoqneam (IL); Mike Joseph Spreitzer, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 12/836,591

(22) Filed: Jul. 15, 2010

(65) Prior Publication Data
US 2012/0016979 A1  Jan. 19, 2012

(51) Int. Cl.
*G06F 15/16* (2006.01)
*G06F 15/173* (2006.01)

(52) U.S. Cl.
USPC ........... 709/204; 709/224; 709/205; 709/206; 709/207

(58) Field of Classification Search
USPC .......................... 709/204, 205, 206, 207, 224
See application file for complete search history.

(56) References Cited

U.S. PATENT DOCUMENTS

| | | | |
|---|---|---|---|
| 6,292,803 B1 | 9/2001 | Richardson et al. | |
| 7,269,628 B1 * | 9/2007 | Buchsbaum et al. | 709/206 |
| 7,590,691 B2 | 9/2009 | Gonsalves et al. | |
| 7,596,625 B2 | 9/2009 | Manion et al. | |
| 2003/0088696 A1 * | 5/2003 | McCanne | 709/238 |
| 2004/0006613 A1 * | 1/2004 | Lemieux et al. | 709/223 |
| 2004/0010616 A1 * | 1/2004 | McCanne | 709/238 |
| 2005/0060406 A1 * | 3/2005 | Zhang et al. | 709/225 |
| 2005/0086469 A1 * | 4/2005 | Dunagan et al. | 713/163 |
| 2005/0251556 A1 * | 11/2005 | Ginis et al. | 709/206 |
| 2005/0251811 A1 * | 11/2005 | Ginis et al. | 719/313 |
| 2006/0037055 A1 * | 2/2006 | Hashimoto et al. | 725/86 |
| 2006/0149840 A1 * | 7/2006 | Thompson et al. | 709/224 |
| 2006/0161554 A1 * | 7/2006 | Lucovsky et al. | 707/10 |
| 2006/0168070 A1 * | 7/2006 | Thompson et al. | 709/206 |
| 2006/0168331 A1 * | 7/2006 | Thompson et al. | 709/238 |
| 2006/0224668 A1 * | 10/2006 | Ginis | 709/204 |
| 2006/0225075 A1 * | 10/2006 | Mankovski et al. | 718/102 |
| 2007/0028002 A1 * | 2/2007 | McCanne | 709/238 |
| 2007/0143442 A1 * | 6/2007 | Zhang et al. | 709/217 |
| 2007/0237139 A1 * | 10/2007 | Garcia-Martin et al. | 370/389 |
| 2008/0155520 A1 * | 6/2008 | Meloche et al. | 717/157 |
| 2008/0184262 A1 * | 7/2008 | Ginis et al. | 719/314 |
| 2008/0222277 A1 * | 9/2008 | Park et al. | 709/223 |
| 2008/0244025 A1 * | 10/2008 | Ginis et al. | 709/206 |
| 2008/0287058 A1 * | 11/2008 | Nahm et al. | 455/3.02 |
| 2008/0288655 A1 * | 11/2008 | Zhao et al. | 709/238 |
| 2008/0317028 A1 * | 12/2008 | Chockler et al. | 370/390 |
| 2009/0059937 A1 * | 3/2009 | Kanada | 370/401 |
| 2009/0080344 A1 * | 3/2009 | Park et al. | 370/254 |
| 2009/0185514 A1 * | 7/2009 | Chandra et al. | 370/310 |

(Continued)

*Primary Examiner* — Karen Tang

(57) ABSTRACT

A method of updating statuses of processes in a network is provided. The method may include the following steps: connecting N processes on a K-connected overlay network of nodes which is in operative association with a computer network; determining an update of subscription and un-subscription statuses of at least some of the processes; generating update messages reflecting the subscriptions and the un-subscriptions, the update messages being differences between previous update and current update; and propagating the update messages through the K-connected graph, such that at least some of the processes transfer the update to its respective K neighboring nodes, wherein at least one of the connecting, the subscribing, the unsubscribing, the generating, and the propagating is executed by at least one processor.

15 Claims, 3 Drawing Sheets

(56) References Cited

U.S. PATENT DOCUMENTS

| | | | |
|---|---|---|---|
| 2009/0207840 A1* | 8/2009 | McCanne | 370/390 |
| 2011/0087789 A1* | 4/2011 | Savolainen et al. | 709/228 |
| 2011/0125921 A1* | 5/2011 | Karenos et al. | 709/240 |
| 2011/0185082 A1* | 7/2011 | Thompson | 709/238 |
| 2011/0208824 A1* | 8/2011 | Lidstrom et al. | 709/206 |
| 2012/0284338 A1* | 11/2012 | Marlow et al. | 709/204 |

* cited by examiner

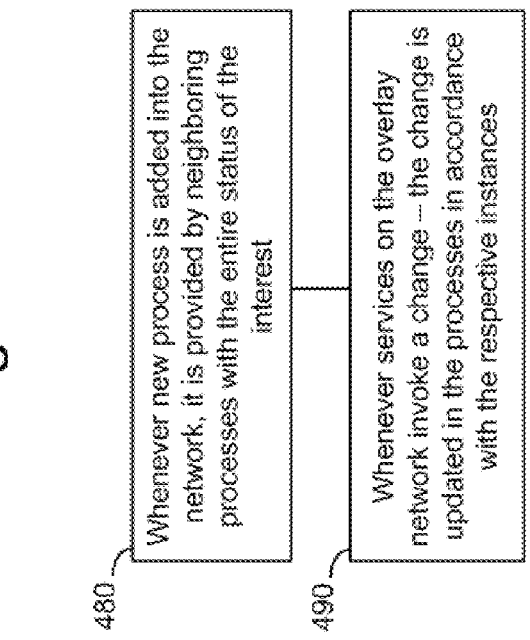
Figure 4C
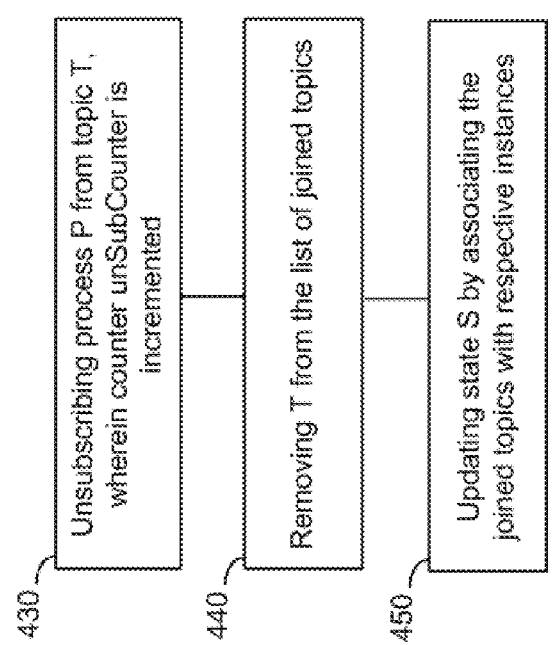
Figure 4D
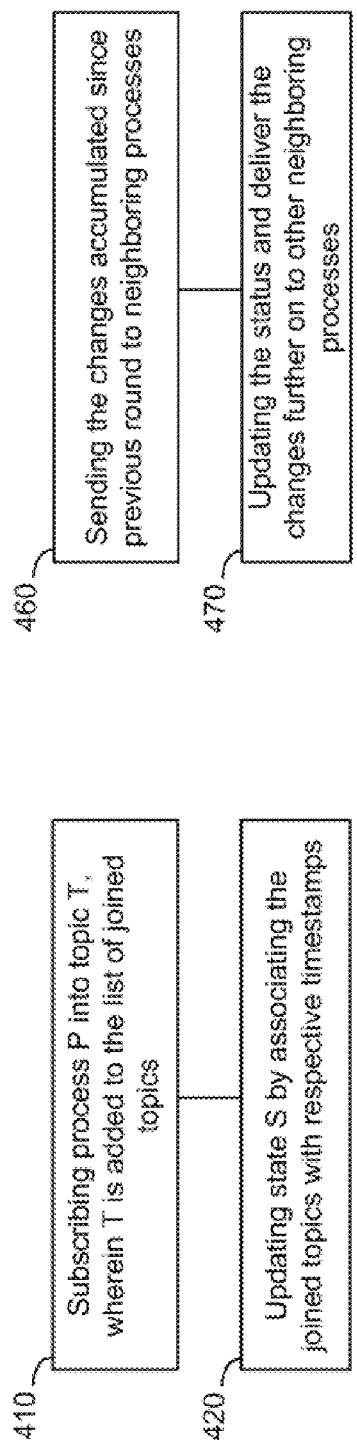
Figure 4A
Figure 4B

PROPAGATING CHANGES IN TOPIC SUBSCRIPTION STATUS OF PROCESSES IN AN OVERLAY NETWORK

BACKGROUND

1. Technical Field

The present invention relates to computer networks and more particularly, to monitoring the processes in such networks.

2. Discussion of the Related Art

Networks of processes in which the processes are constantly subscribing, unsubscribing, or publishing topics pose a challenge for effective propagation of the current subscription status of each process. In such networks, usually implemented over a computer network, each process may either voluntarily or involuntarily join or leave a topic selected from a space of topics reflecting the subject of interest of the respective processes. One requirement of effective propagation of the subscription status of processes in a network is that under conditions of stability and within a specified period of time, all processes in the network are informed with the subscription status of each and every process in the network. Usually, the propagation of the subscription status of the processes is achieved by repeatedly transferring messages (known as interest views) between processes in the network.

Several attempts to deal with the propagation of subscription status of processes within a network are known in the existing art. One such attempt is known as Virtually Synchronous Group Membership protocols. These protocols support strong quality of service with respect to the consistency on the interest views, and synchronization with the stream of delivered messages. Some examples include: DCS, Transis, Horus, and Spread.

The aforementioned protocols tend to suffer from several drawbacks such as: high network usage, high runtime costs, high latency caused by the multiple message rounds that should be executed to reach decision on the next view, high likelihood of blocking normal operation during reconfiguration due to the need to synchronize views with the message streams, and reliance on IP multicast, or hardware supported broadcast for message transport which is undesirable in the production environments due to security limitations.

Other attempts to deal with subscription status propagation include server-based Group Membership services. Some of these systems follow the client/server paradigm. In these systems, a small group of servers manages the interests of all the other processes in the system. These solutions tend to suffer from scalability issues (due to unequal load distribution), simplicity issues (due to the necessity to configure and dynamically maintain a set of dedicated processes), and availability limitations (the availability of the service is only as good as the availability of the membership servers).

Yet other attempts to deal with subscription status propagation include Lightweight Group Membership services that are based on randomized gossip protocols. Some of these membership protocols employ randomized pair-wise gossiping to disseminate the view updates. These protocols are scalable and simple. However, due to the randomized neighbor selection, and limited fan-out, they are only able to supply probabilistic guarantees with respect to the view propagation latency.

BRIEF SUMMARY

One aspect of the invention provides method of updating statuses of processes in a network. The method may include the following steps: connecting N processes on a K-connected overlay network of nodes which is in operative association with a computer network; monitoring subscription and un-subscription of at least some of the processes into or from topics; determining an update of subscription and un-subscription statuses of at least some of the processes; generating update messages reflecting the subscriptions and the un-subscriptions, the update messages being differences between previous update and current update; and propagating the update messages through the K-connected graph, such that at least some of the processes transfer the update to its respective K neighboring nodes.

Other aspects of the invention may include a system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 4A-4D are high level flowchart diagrams illustrating aspects according to some embodiments of the invention.

Figure 2:
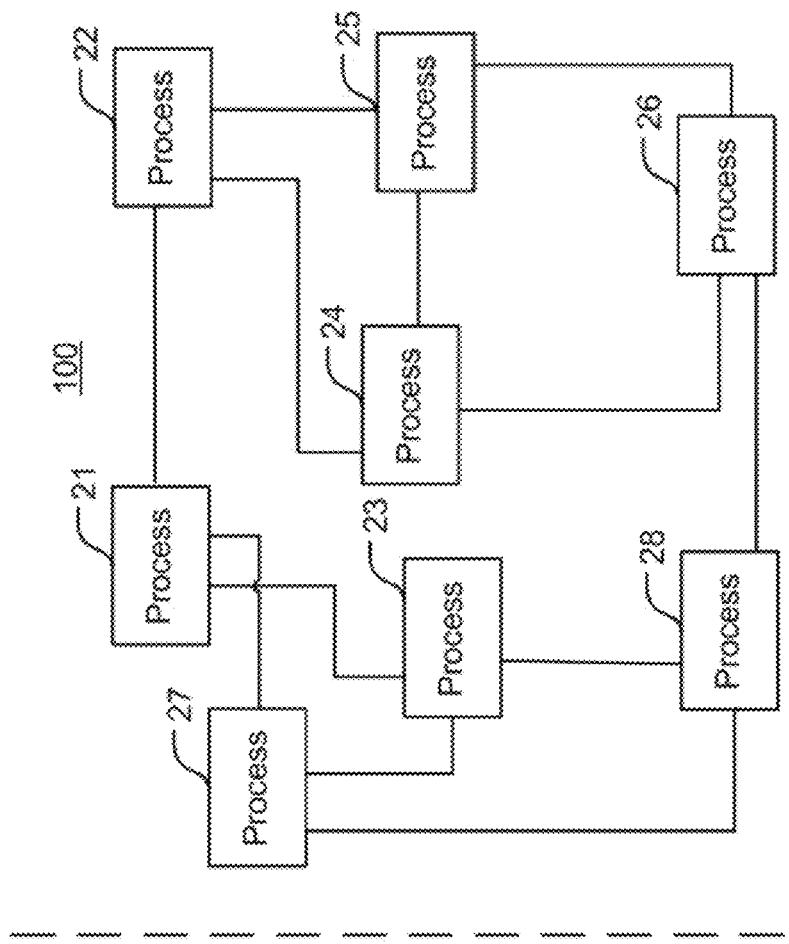
FIG. 2 is a high level graph diagram illustrating the system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "process" as used herein in this application refers to an instance of a computer program that is being executed. It contains the program code and its current activity. Depending on the operating system, a process may be made up of multiple threads of execution that execute instructions concurrently. While a computer program is a passive collection of instructions, a process is the actual execution of those instructions. Several processes may be associated with the same program; for example, opening up several instances of the same program means more than one process is being executed.

The term "topic" (aka "group name") as used herein in this application refers to a subject of interest with which a plurality of users may be associated. The act of joining a topic is called subscription while the act of leaving a topic is called un-subscription. In addition, any scenario in which a process disconnects or ceases to be active also results in un-subscription from its respective topics.

The term "peer-to-peer" commonly abbreviated to "P2P" as used herein in this application refers to any distributed network architecture composed of equal participants (peers) that make a portion of their resources (such as processing power, disk storage or network bandwidth) directly available to any other network participants, without the need for central coordination instances (such as servers or stable hosts). Peers may be both suppliers and consumers of resources, in contrast to the traditional client-server model where only servers supply, and clients consume.

The term "overlay network" as used herein in this application refers to a computer network which is built on top of another network. Nodes in the overlay can be thought of as being connected by virtual or logical links, each of which corresponds to a path, perhaps through many physical links, in the underlying network. For example, many peer-to-peer networks are overlay networks because they run on top of the Internet.

The term "K-connected graph" as used herein in this application refers to a connected graph (a graph each two nodes are connected via vertices) in which any node has at least K neighboring nodes. More formally, a graph G is said to be K-connected if there does not exist a set of K−1 vertices whose removal disconnects the graph, i.e., the vertex connectivity of G is $\geq K$.

The term "gossip session" or "gossip exchange" as used herein in this application refers to a repeated process that carries out an update of data between agents (peers, nodes) over a network. Specifically, data is repeatedly transferred from agents to a limited number of other agents in each iteration. Usually, a gossip protocol meets the following conditions: the gossip protocol involves periodic, pair-wise, and inter-process interactions; the information exchanged during these interactions is of bounded size; and when agents interact, the state of at least one agent changes to reflect the state of the other. In the private case, consistent with embodiments of the invention, when a gossip exchange is being performed over an overlay network, data is transferred (via messages) only between neighboring agents (processes).

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
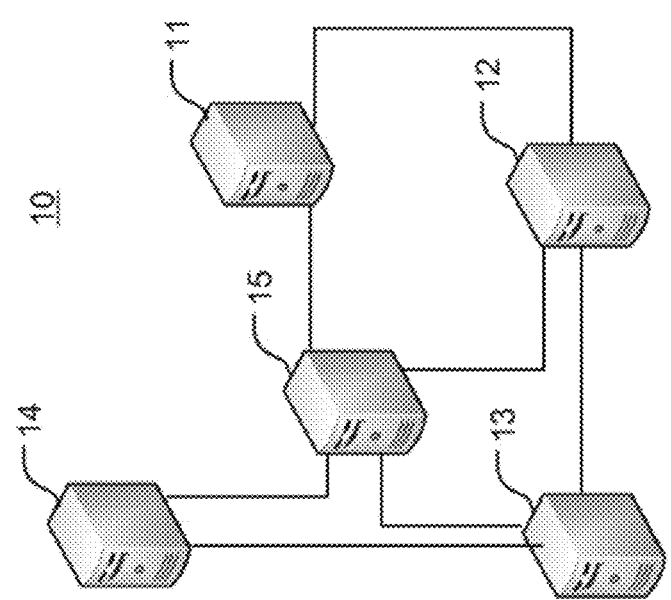
FIG. 1 is a high level schematic block diagram illustrating an environment of a system according to some embodiments of the invention.

FIG. 1 is a high level schematic block diagram illustrating an exemplary environment of a system according to some embodiments of the invention. According to the exemplary embodiment, computer network 10 may include a plurality of servers 11-15 being all connected over a common communication network.

FIG. 2 shows, in a connected graph format, system 100 in the form of a corresponding overlay network that includes N=8 processes 21-28 in a configuration that does not necessarily present a one to one ratio with servers 11-15. Practically, but not necessarily, there are usually far more processes on overlay network than servers (or any other computing devices) on computer network 10. Each one of processes 21-28 may be subscribed to a topic or a group that are within its subject of interest. These topics are in turn associated with publishers (not shown) that provide data relating to the topic or the group to the subscribed process. It is understood however, the any of the processes may further be configured to serve as a publisher for other processes while being a subscriber to topics published by others.

In operation, processes tend to voluntarily (for example, as per a user's request) or involuntarily (e.g. due to infrastructure failure) subscribe to or unsubscribe from topics alike. The processes are connected on overlay network in a K-connected graph configuration (here K=3). In other words, each one of processes 21-28 is connected to K=3 neighboring processes. Whenever a change in subscription occurs, this change is being propagated by the relevant process to its neighboring processes, performing a gossip exchange over an overlay network. The use of a relatively small number of neighboring processes (e.g., two or three orders of magnitude below the expected number of the topics) for each process and the use of further features detailed below results in a cost-effective propagation of the interests of all processes throughout the overlay network. Another advantage is that K is a constant and therefore independent of the number of any of: the processes, the topics or the amount of data from the publishers.

As explained above, system 100 is a distributed network of N processes 21-28 connected on a K-connected overlay network which is in operative association with computer network 10. Connecting N processes 21-28 on a K-connected overlay network of nodes enables applying benefits of overlay networks to the propagation challenge. At least some of processes 21-28 are configured to: determine an update of subscription and un-subscription into or from topics of at least some of the processes; generate update messages reflecting the subscriptions and the un-subscriptions, the update messages being differences between previous update and current update; and propagate the update messages through the K-connected graph, such that at least some of the update messages are transferred to the process's respective K neighboring nodes.

The gathered information is then being propagated via the distributed network, taking advantage of the K-connected graph configuration of the overly network. In each gossip exchange performed over the overlay network, each one of the processes sends a news message to at least some of its K neighboring processes, wherein each news message contains data regarding joined and left topics associated with instances which occur later than an instance of a previous update. Then, each one of the processes goes on to update an interest view based on the news messages received from at least some of the K neighboring processes, wherein the interest view indicates the topics or the groups that each process is currently subscribed to.

Each one of the processes may further be configured to send the updated interest view to at least some of its K neighboring processes. Thus, the processes serve not only as propagation means for the change (difference only) relevant to their individual processes, but rather to the comprehensive interest view of processes throughout the overlay network entirely.

Consistent with embodiments of the invention and overlay networks theory, it would be beneficial to set K as a small number (e.g., K=6) for several thousands of processes (N) and several hundred to several thousands of topics. As there is an inherent tradeoff between the network being an overlay network and the number of messages that may be transferred over the network, setting K to a small number independent of the number of processes or topics, being two or three orders of magnitude below the number of topic and process may optimize the results in terms of complexity. However, these figures are provided for demonstration purposes only and should not be regarded as posing any limitation on the number of neighbors selected in the overly network.

As explained above, and consistent with embodiments of the invention, each gossip exchange of updates is event driven. The trigger for such a gossip exchange may be an accumulation of new updates above a specified threshold or any other trigger. Advantageously, by applying the aforementioned gossip exchanges over an overlay network, each one of the processes within the network will be updated with any change of subscription status in any of the other processes within O(log(N)) time on average, with a worst case scenario of O(N) of time, wherein N is the number of processes in the network.

In order to achieve a further reduction in complexity of the propagation of the interest view of the processes, each process may be provided with a hash function module (not shown) configured to apply at least one hash function to actual names of the topics or the groups such that the joined or left topics are stored as hashed values.

Consistent with one embodiment of the invention, an unsubscribe counter is employed for indicating whenever a specific topic has been unsubscribed by a specific process. Whenever a process unsubscribes a topic, the process loses the data related to the unsubscribed topic. In case the process re-subscribes, the data need to be retrieved. However, if a sequence of unsubscribe-subscribe occurs between two gossip sessions, the fact that a topic has been unsubscribed may be missed (hidden leave) since the current status (subscribe) is equal to the previous status (subscribe). Thus, a counter indicating an un-subscription may be used to assert that the data relating to the presently subscribed topic is required due to the previously unmonitored un-subscription.

Consistent with some embodiments of the invention, the K-connected configuration of the overlay network is maintained even in the case of a process leaving or joining the network. This is done by establishing and omitting connection between peers on an ad hoc basis.

In addition to maintaining the K-connected nature of connectivity, once a process detects a newly presented neighboring process, all updated data is directly sent to the newly detected process.

While each one of the processes may be usually controlled by a user, such that subscribing and unsubscribing are in response to a user request, other overlay network services, as well as services external to the overlay network may invoke either subscription or un-subscription.

Figure 3:
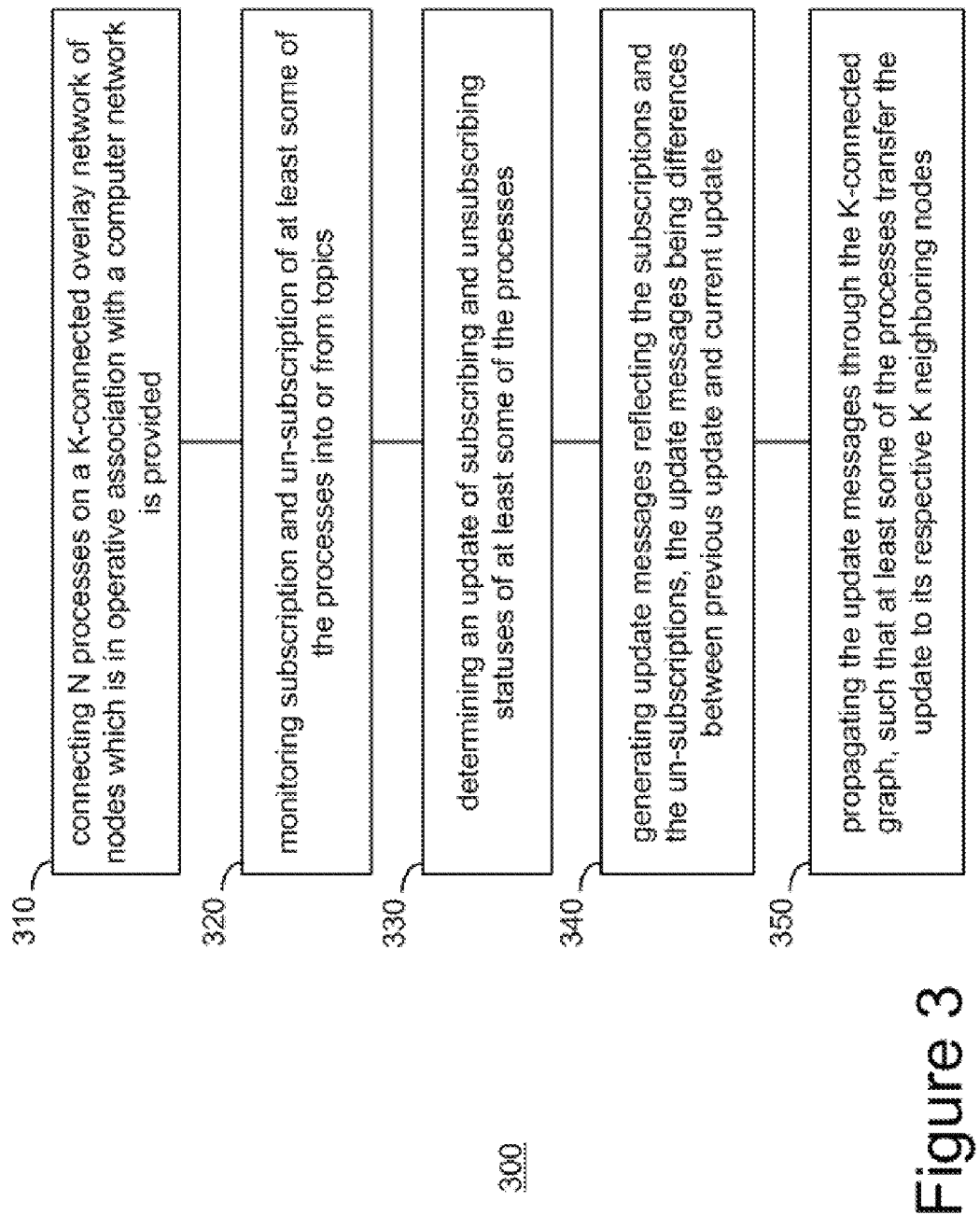
FIG. 3 is a high level flowchart diagram illustrating a method according to some embodiments of the invention.

FIG. 3 is a high level flowchart diagram illustrating a method according to some embodiments of the invention. Method 300 may include the following steps: in a preliminary step, the step of connecting N processes on a K-connected overlay network of nodes which is in operative association with a computer network is provided 310. The method goes on to monitoring subscription and un-subscription of at least some of the processes into or from topics 320. Then the method proceeds with the step of determining an update of subscribing and unsubscribing statuses of at least some of the processes 330. Then the method goes to the step of generating update messages reflecting the subscriptions and the un-subscriptions, the update messages being differences between previous update and current update 340. Finally, in an ongoing step, the method goes into propagating the update messages through the K-connected graph, such that at least some of the processes transfer the update to its respective K neighboring nodes 350.

In order to implement method 300, a computer (not shown) may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

Consistent with one embodiment of the invention, propagating the update of statuses in each and every process is carried out by gossip exchange. Once an update is generated, the differences between the new status and the previous status are being transferred from node to node. Optionally, propagating the update is initiated whenever the subscribing and unsubscribing exceeds a specified threshold.

Optionally, method 300 may further include the step of applying at least one hash function to actual names of the topics or the groups such that the joined or left topics are stored as hashed values. As explained above, hashing may significantly reduce the amount of data that is used in updating the status of the topics joined and left.

Optionally, method 300 may further include the feature according to which the unsubscribing invokes a setting of an unsubscribe counter indicating a leave of a topic, such that a propagated update indicates a need to retrieve data for the unsubscribed topic in case of a re-subscription.

Optionally, method 300 may further include the step of sending the updated interest view by each process to any newly detected neighboring process.

It is understood that the subscribing or the unsubscribing is performed in response to at least one of: user request, overlay network services, and services external to the overlay network.

FIGS. 4A-4D are high level flowchart diagrams illustrating aspects according to some embodiments of the invention. The following are non limiting implementations of some of the features described herein according to embodiments of the invention. It is understood that other manners of implementing the embodiments of the invention are possible.

FIG. 4A shows a flowchart implementing the subscribe action that may also be expressed in a pseudo code formation as follows:

---
On subscribe(T):
    interest(P) := interest(P) U {(T,unSubCount)};
    S[P] := (P, ++S[P].ts, interest(P));

---

In the above pseudo code, and as shown in the accompanying figure in the case of subscription of process P into topic T, T is added to the list of joined topics 410. The counter, unSubCount is used as explained above to indicate a case of hidden leave of a topic in which a topic is unsubscribed and then re-subscribed, wherein two consecutive update sessions occur when the topic is subscribed (hence the hidden unsubscription). Then the state S is updated by associating the joined topics with respective instances 420.

FIG. 4B shows a flowchart implementing the subscribe action that may also be expressed in a pseudo code formation as follows:

```
On unsubscribe(T):
    unSubCounter++;
    interest(P) := interest(P) \ {(T,C)}
    S[P] := (P, ++S[P].ts, interest(P));
```

In the above pseudo code and as shown in the accompanying figure, in the case of unsubscription of process P from topic T, counter unSubCounter is set 430. T is then removed from the list of joined topics 440. Then the state S is updated by associating the joined topics with respective instances 450.

FIG. 4C shows a flowchart implementing the gossip round in which updated status is propagated to neighboring processes. The gossip round may also be expressed in a pseudo code formation as follows:

```
On each gossip round:
    Send all news {(Pi, ts, interest(Pi))}
        accumulated since the previous round to all neighbors
Upon receiving news from a neighbor:
    Update State;
    Deliver ViewChange incl. each Pi with changed
    interest
```

In the above pseudo code and as shown in the accompanying figure, on each gossip round each process sends the changes accumulated since previous round to neighboring processes 460 which in turn update the status and deliver the changes further on to other neighboring processes 470.

FIG. 4D shows a flowchart implementing operations executed in response to changes within the overlay network. These may also be expressed in a pseudo code formation as follows:

```
Upon detecting a new neighbor Q:
    Send the entire State to Q
    (note: Q will only propagate news!)
Upon receiving a view change from overlay network:
    Update S based on instances
```

In the above pseudo code and as shown in the accompanying figure, whenever a new process is added into the network, it is provided by neighboring processes with the entire status of the interest 480. In addition, whenever services on the overlay network invoke a change—the change is updated in the processes in accordance with the respective instances 490.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:

connecting N processes on a K-connected overlay network of K nodes connected by a plurality of bi-directional links, said K-connected overlay network is in operative association with a computer network, said K nodes and said plurality of bi-directional links respectively correspond with a plurality of vertexes and a plurality of edges of a K-connected graph wherein the result of deleting any set of k−1 or fewer vertexes is a connected graph;

monitoring subscription and un-subscription of at least some of the processes into or from topics;

determining an update of subscription statuses and un-subscription statuses of at least some of the processes;

generating update messages reflecting the subscription statuses and the un-subscription statuses, the update messages comprise differences between previous update and current update;

propagating the update messages through the plurality of bi-directional of the K-connected overlay network, from node to node of said K nodes, such the update is transferred or received by each of said K nodes; and applying at least one hash function to actual names of the topics such that names of subscribed and unsubscribed topics are stored as hashed values to reduce size of statuses update messages:

wherein at least one of the connecting, the monitoring, the generating, and the propagating is executed by at least one processor;

wherein in the propagating the update is initiated whenever the subscription statuses and the un-subscription statuses exceed a specified threshold.

2. The method according to claim 1, wherein in the propagation, each of the N processes is configured to send update messages to K connected neighboring processes in response to receiving of an update from at least one neighboring process out of the N processes.

3. The method according to claim 1, wherein each of the un-subscriptions invokes an unsubscribe counter indicative of an un-subscription from a respective topic from the topics, such that a propagated update message indicates a need to retrieve data for the respective topic in case of a re-subscription.

4. The method according to claim 1, further comprising sending the subscription statuses and un-subscription statuses by at least some of the N processes to any newly detected neighboring process out of the N processes.

5. The method according to claim 1, wherein the subscription or the un-subscription is performed in response to at least one of: user request, overlay network services, and services external to the overlay network.

6. The method of claim 1, wherein in said K connected network, K is a constant and independent of the number of the N processes and the number of the topics.

7. The method of claim 1, wherein at least one of said plurality of processes is configured to serve as a publisher for some of said plurality of processes while being a subscriber to topics published by others of said plurality of processes.

8. A computerized system comprising:
a computerized processor;
a memory coupled to and accessible by said computerized processor;
N processes connected over a K-connected overlay network of K nodes connected by a plurality of bi-directional links, said K-connected overlay network is in operative association with a computer network, said K nodes and said plurality of bi-directional links respectively correspond with a plurality of vertexes and a plurality of edges of a K-connected graph wherein the result of deleting any set of k−1 or fewer vertexes is a connected graph,
wherein at least some of the N processes are configured to:
determine, using said computerized processor, an update of subscription and un-subscription into or from topics of at least some of the N processes;

generate update messages reflecting the subscriptions statuses and the un-subscriptions statuses, the update messages comprise differences between previous update and current update; and propagate the update messages through the plurality of bi-directional of the K-connected overlay network, from node to node of said K nodes, such the update is transferred or received by each of said K nodes;

apply at least one hash function to actual names of the topics such that names of subscribed and unsubscribed topics are stored as hashed values to reduce size of statuses update messages;

wherein in the propagating the update is initiated whenever the subscription statuses and the un-subscription statuses exceed a specified threshold.

9. The system according to claim 8, wherein each of the N processes is configured to send updates to K connected neighboring processes in response to receiving of an update from at least one neighboring process out of the N processes.

10. The system according to claim 8, wherein the processes are further configured to invoke an unsubscribe counter whenever a respective topic from the topics is unsubscribed from indicating an un-subscription from the respective topic, such that a propagated update indicates a need to retrieve data for the respective topic in case of a re-subscription.

11. The system according to claim 8, wherein at least some of the N processes are configured to send the subscription statuses and un-subscription statuses to any newly detected neighboring process out of the N processes.

12. The system according to claim 8, wherein the N processes are further configured to subscribe or unsubscribe in response to at least one of: user request, overlay network services, and services external to the overlay network.

13. A computer program product, for connecting N processes, the computer program product comprising:
a non-transitory computer usable storage medium having computer readable program embodied therewith, the computer readable program comprising:
first computer readable program configured to connect N processes on a K-connected overlay network of K nodes connected by a plurality of bi-directional links, said K-connected overlay network is in operative association with a computer network, said K nodes and said plurality of bi-directional links respectively correspond with a plurality of vertexes and a plurality of edges of a K-connected graph wherein the result of deleting any set of k−1 or fewer vertexes is a connected graph;
second computer readable program configured to determine an update of subscription statuses and un-subscription statuses of at least some of the N processes into and from topics;
third computer readable program configured to generate update messages reflecting the subscription statuses and the un-subscription statuses, the update messages comprise differences between previous update and current update;
forth computer readable program configured to propagate the update messages through the plurality of bi-directional of the K-connected overlay network, from node to node of said K nodes, such the update is transferred or received by each of said K nodes; and
fifth computer readable program configured to apply at least one hash function to actual names of the topics such that names of subscribed and unsubscribed topics are stored as hashed values to reduce size of statuses update messages;

wherein in the propagating the update is initiated whenever the subscription statuses and the un-subscription statuses exceed a specified threshold wherein said first, second, third, fourth, and fifth computer readable programs are stored on said non-transitory computer usable storage medium.

14. The computer program product according to claim 13, further comprising fifth computer readable program configured to send updates to K connected neighboring processes in response to receiving of an update from at least one neighboring process out of the N processes.

15. The computer program product according to claim 13, further comprising ninth computer readable program configured to send the subscription statuses and un-subscription statuses to any newly detected neighboring process.

* * * * *